Feb. 27, 1968   D. H. RUSH   3,370,987
COMBINATION APPARATUS COVER AND BATTERY PACK
Filed April 4, 1966
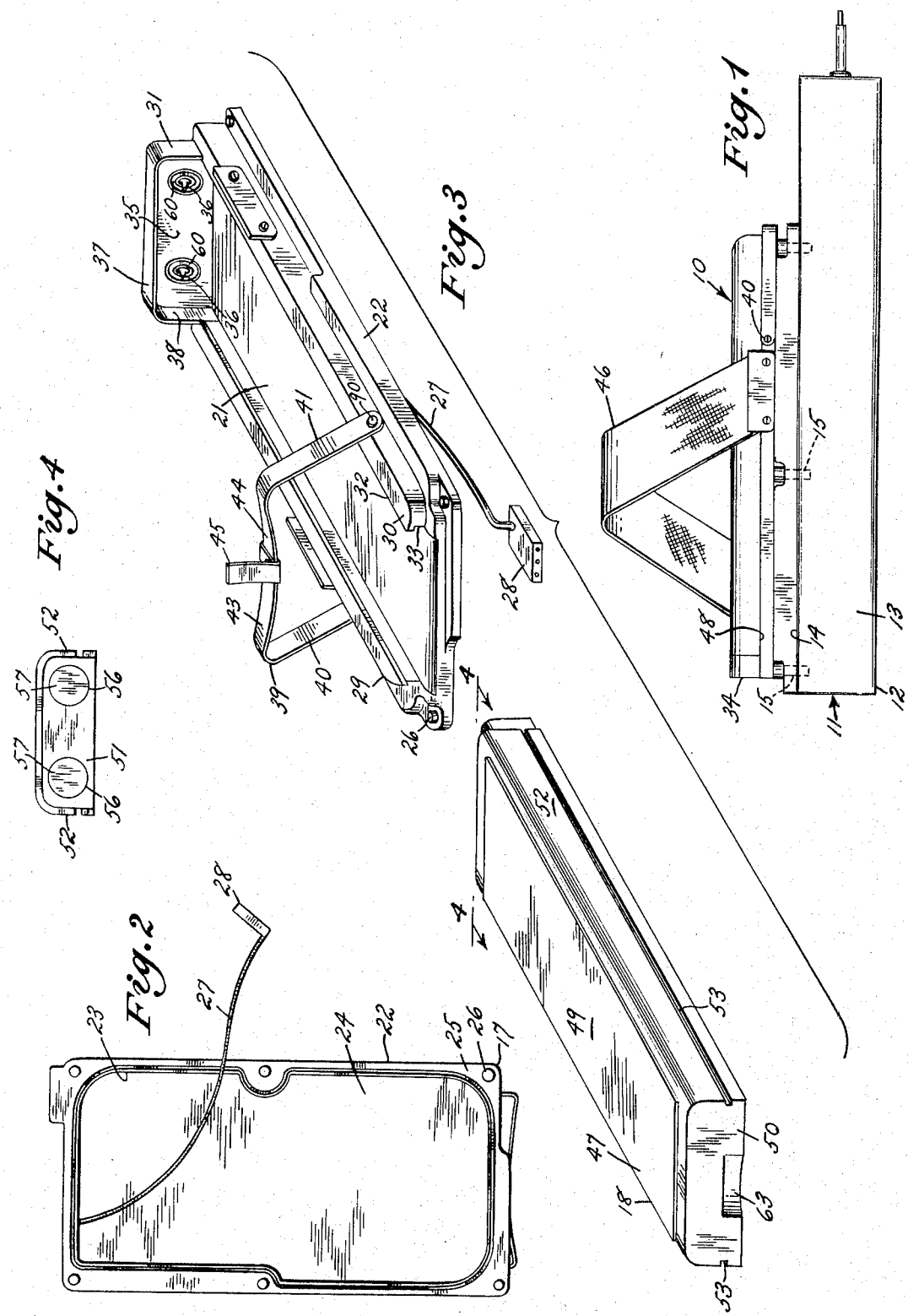

United States Patent Office 3,370,987
Patented Feb. 27, 1968

3,370,987
COMBINATION APPARATUS COVER AND BATTERY PACK
David H. Rush, New York, N.Y., assignor to ACR Electronics Corp., New York, N.Y.
Filed Apr. 4, 1966, Ser. No. 540,042
2 Claims. (Cl. 136—135)

ABSTRACT OF THE DISCLOSURE

A combination apparatus cover and battery pack therefore, said cover and pack being mutually slidably engagefor, said cover and pack being mutually slidably engagehaving a penetrable material covering the same, said electrical terminals on said cover having means penetrating said penetrable material upon engagement of said battery pack with said cover.

---

This invention relates generally to the field of battery powered electrical equipment, and more particularly to an improved combination apparatus cover and battery pack therefor, which permits the replacement of a battery pack for powering the encased apparatus, without the necessity of removing the cover of the apparatus and subjecting the apparatus to the deleterious effects of moisture, physical contact or the like during battery replacement. While the invention has many useful applications, it is particularly suited for incorporation into relatively lightweight portable electrical apparatus, such as wireless communication devices principally used outdoors, and the like.

In the case of so-called "walkie-talkies" used by the military, the apparatus is subjected to extremes of heat and cold, moisture in the form of rain or snow, and damage due to dropping or accidental contact with other objects. It is therefore highly desirable that such apparatus, which is normally installed within a relatively rigid casing element should be exposed as little as possible, and the replacement of a self-contained power source should also be accomplished without the necessity of opening the casing element in which the apparatus is disposed. This is desirable, not only from the standpoint of protecting the apparatus, but for convenience in the field for the user, who must often replace the power pack with hands that have been numbed by cold, and which therefore have less than normal flexibility and sensitivity. Since the power outlet of many self-contained power packs is deleteriously affected by cold, it is desirable that an unexhausted battery be readily removable from the device, in order to be placed in some position within the clothing of the wearer to be warmed prior to use, and immediately again installed in operative condition with respect to the apparatus.

It is therefore among the principal objects of the present invention to provide an improved combination apparatus cover and battery pack which will fulfill the above described ends.

Another object of the invention lies in the provision of an improved combination apparatus cover and battery pack therefor, in which the apparatus cover is provided with track means for slidably engaging the battery pack externally of the cover, relative movement between the pack and the cover establishing electrical communication between the pack and the apparatus disposed within the cover.

Another object of the invention lies in the provision of a combination apparatus cover and battery pack, in which the battery pack may be installed and removed with a minimum of manipulation, and within a short period of time without resort to any tools.

Yet another object of the invention lies in the provision of a combination apparatus cover and battery pack of unusually sturdy construction, whereby the same may withstand considerable abuse incident to field use.

A feature of the disclosed embodiment lies in the complete absence of any threaded means which must be rotated by the user to engage or disengage the battery pack with respect to the apparatus cover.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a side elevational view of an embodiment of the invention in installed condition with an electrically powered portable apparatus.

FIGURE 2 is a view in elevation of the inner surface of the apparatus cover in detached condition from the apparatus.

FIGURE 3 is a fragmentary exploded view in perspective showing the assembly and disassembly of the battery pack with respect to the apparatus cover.

FIGURE 4 is an end elevational view of the battery pack.

In accordance with the invention, the device, generally indicated by reference character 10 is illustrated in FIGURE 1 in installed condition upon an electrical apparatus 11, the apparatus including a generally rectangularly shaped casing element 12 having side walls 13 forming surfaces 14 adapted to abut and engage the device 10. To maintain the device in assembled condition, the casing element 12 is provided with tapped bores 15 for the penetration of screw means. The device 10 comprises broadly: a cover element 17 and a battery pack element 18.

The cover element 17 is preferably formed as a casting of metallic materials, and includes a generally planar wall 21 surrounded by a continuous peripheral flange 22 which forms a recess (see FIGURE 2). Disposed within the recess 23 is a foamed synthetic resinous pad 24, which serves to cushion the apparatus (not shown) disposed within the casing element 12. The flange 22 defines a planar surface 25 abutting the surfaces 14, and threaded screw means 26 projects through the cover element 17 into the tapped bores 15 to maintain the cover element upon the casing element in well known manner. Extending outwardly of the recess 23 is a wide cable 27 having a plug connector 28 on a free end thereof, the cable 27 being internally connected to means to be described hereinbelow for completing a circuit through the battery pack element 18.

Mounted upon an outer surface of the wall 21 are a pair of track-forming rail members 29 and 30, terminating at one end thereof in a laterally projecting bumper element 31. The rail members 29–30 each include a projecting lip 32 forming a groove 33 in which the battery pack element 18 is slidably engaged. The bumper element 31 may be cast integrally with the wall 21, and is bounded by an outer surface 34 and an inner surface 35 from which project resilient terminals 36 connected to the above mentioned cable 27. A flange 37 forms a recess 38 in which a corresponding portion of the battery pack element is selectively positioned. If desired, the terminals 36 may be surrounded by resilient O-rings 60 to assure a moistureproof interconnection.

Pivotally secured to the outer surfaces of the rail members 29 and 30 is a resilient locking member 39 penetrated by screw means 90 at the ends of each of two legs 40 and 41. The cross-piece 43 interconnects the legs 41 and 42, and includes a bowed central portion 44, preferably provided with finger-engaging strap means 45 to facilitate manual manipulation thereof between engaged and disengaged positions with respect to the battery pack element. If desired, an additional carrying strap 46 may be also mounted on the rail members 29–30.

The battery pack element 18 includes a synthetic resinous molded body 47 bounded by an inner surface 48, an outer surface 49, an outer end surface 50, an inner end surface 51 and side surfaces 52, each having a groove 53 therein engageable with the lid 32 on one of the rail members 29–30. The body 47 is formed by potting a plurality of mercury type cells (not shown) within a mold, the synthetic resinous material being cured with the cells in situ, using techniques well known in the art. The cells communicate with a pair of terminals 56 disposed at or slightly below the inner surface 48, the terminals being preferably covered with a layer of cured silicone rubber 57 to prevent oxidation thereof. The layer 57 is normally penetrated by the sharpened end of the member 36, preferably formed as a stainless steel spring, upon engagement therewith with terminals 56.

To replace an exhausted battery pack element 18, it is necessary only to manually grasp the strap means 45, and while simultaneously pulling the bowed center portion 44 outwardly, the member 39 is swung upwardly as seen in FIGURE 3 to clear the outer surface 50. The battery pack element may then be slid along the rail members 29 and 30 to a point of complete disengagement. The insertion of a fresh battery pack element requires only the alignment of the grooves 53 with the lip 32, and a sliding movement toward the bumper element 31 to a point where the inner end surface 51 is disposed within the recess 38. The strap means 45 may then be manually pulled, and rotated to its initial condition wherein the central portion 44 engages a recess 63 in the outer end surface 50.

I wish it to be understood that I do not consider the invention limited to the precise details of structure shown and set forth in this specification, for obvious modifications will occur to those skilled in the art to which the invention pertains.

I claim:

1. In combination, a battery pack element having at least one conductive terminal positioned in an external surface thereof, a layer of penetrable resilient material covering said terminal; resilient contact means selectively engaged with said terminal, said contact means including a pointed end thereon penetrating said penetrable material to establish electrical contact with said terminal upon engagement of said battery pack element with said contact means.

2. Structure in accordance with claim 1, said contact means including a resilient O-ring surrounding said pointed end, and engaging the outer surface of said penetrable material, to form a complete seal therearound.

References Cited

UNITED STATES PATENTS

| 2,729,693 | 1/1956 | Waber | 136—133 |
| 3,186,878 | 6/1965 | Filander | 136—173 |
| 3,194,689 | 7/1965 | Deschamps | 136—173 |

ALLEN B. CURTIS, *Primary Examiner.*

WINSTON A. DOUGLAS, *Examiner.*

D. L. WALTON, *Assistant Examiner.*